(12) United States Patent
Schlesinger et al.

(10) Patent No.: US 11,704,746 B2
(45) Date of Patent: Jul. 18, 2023

(54) EXTENDIBLE USER PROFILES

(71) Applicant: MICROSOFT TECHNOLOGY LICENSING, LLC, Redmond, WA (US)

(72) Inventors: Benny Schlesinger, Ramat Hasharon (IL); Shira Weinberg, Tel Aviv (IL)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 17/155,989

(22) Filed: Jan. 22, 2021

(65) Prior Publication Data

US 2021/0150635 A1 May 20, 2021

Related U.S. Application Data

(63) Continuation of application No. 15/637,749, filed on Jun. 29, 2017, now abandoned.

(51) Int. Cl.
*H04L 67/306* (2022.01)
*H04W 4/08* (2009.01)
*G06Q 50/00* (2012.01)
*G06F 16/435* (2019.01)

(52) U.S. Cl.
CPC ........... *G06Q 50/01* (2013.01); *G06F 16/437* (2019.01); *H04L 67/306* (2013.01); *H04W 4/08* (2013.01)

(58) Field of Classification Search
CPC ..... G06Q 50/01; G06F 16/437; G06F 13/437; H04L 67/306; H04W 4/08
See application file for complete search history.

(56) References Cited

U.S. PATENT DOCUMENTS

| | | | |
|---|---|---|---|
| 2005/0210409 A1* | 9/2005 | Jou .................. | G06Q 10/00 715/811 |
| 2009/0254859 A1* | 10/2009 | Arrasvuori ............ | G06Q 10/10 715/810 |
| 2010/0088611 A1 | 4/2010 | Siegal et al. | |
| 2012/0042013 A1* | 2/2012 | Roman ................ | G06Q 10/101 709/204 |
| 2013/0185285 A1* | 7/2013 | Shuman ................. | H04L 51/04 707/722 |
| 2014/0082073 A1* | 3/2014 | Wable ................... | H04L 67/306 709/204 |
| 2014/0245162 A1* | 8/2014 | Deibler ................ | G06Q 10/103 709/204 |

(Continued)

OTHER PUBLICATIONS

"Office Action Issued in Indian Patent Application No. 201947052484", dated Feb. 28, 2022, 8 Pages.

(Continued)

*Primary Examiner* — Chris Parry
*Assistant Examiner* — Steven C Nguyen
(74) *Attorney, Agent, or Firm* — Shook, Hardy & Bacon L.L.P.

(57) ABSTRACT

Implementations described herein disclose a method, an article of manufacture, and a system for displaying user profile information using extendible user profiles for user groups. A user profile with an application user profile is maintained. A value provided by a user joining a group for a group specific field is used to override a user profile field maintained in the application user profile.

17 Claims, 7 Drawing Sheets

(56) References Cited

U.S. PATENT DOCUMENTS

| | | | | |
|---|---|---|---|---|
| 2015/0150052 | A1* | 5/2015 | Errico | H04N 21/84 |
| | | | | 725/46 |
| 2016/0063650 | A1* | 3/2016 | Laivand | G06Q 10/10 |
| | | | | 705/319 |
| 2017/0085691 | A1* | 3/2017 | Kim | H04M 1/27453 |
| 2017/0337248 | A1* | 11/2017 | Blaaberg | G06F 16/20 |
| 2018/0109485 | A1* | 4/2018 | Lai | G06Q 10/10 |

OTHER PUBLICATIONS

"First Office Action and Search Report Issued in Chinese Patent Application No. 201880043651.5", dated Mar. 23, 2023, 13 Pages.

* cited by examiner

EXTENDIBLE USER PROFILES

CROSS-REFERENCE TO RELATED APPLICATIONS

This application entitled "Extendible User Profiles," is a continuation of U.S. application Ser. No. 15/637,749, entitled "Extendible User Profiles" and filed Jun. 29, 2017, the entirety of which is incorporated by reference herein.

BACKGROUND

Advances in computing and mobile technologies have resulted in people using a large number of applications to participate in various activities. Many of these applications, such as social networking applications, texting applications, photo sharing applications, and dating applications, require users to create user profiles including various information about the users. Furthermore, some of these applications also allow users to create groups where members of the group may share information among the group members. For example, a social networking application may allow a group administrator to form a group of members that live in a particular neighborhood.

SUMMARY

Implementations described herein disclose a system for providing extendible user profiles for user groups by providing a group formation user interface to a group administrator, wherein the group formation user interface allows the group administrator to add group specific fields, creating a group table including the group specific fields, and linking the group table to the user profile tables.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Other implementations are also described and recited herein.

BRIEF DESCRIPTIONS OF THE DRAWINGS

A further understanding of the nature and advantages of the present technology may be realized by reference to the figures, which are described in the remaining portion of the specification. In the figures, like reference numerals are used throughout several figures to refer to similar components.

FIG. 1 illustrates an example implementation of a system for providing extendible user profiles.

FIG. 2 provides an example visual representation of user profile provided by the extendible user profile system disclosed herein.

DETAILED DESCRIPTION

Users of computing devices use a large number of applications to get information and to interact with other users. For example, social networking applications are widely used by consumers to interact with other members of such social network. Many of these applications require users to create user profiles including various information about the users. For example, a photo sharing application may require users to provide their name, email address, date of birth, city and state of residence, and a profile picture. Furthermore, some of these applications also allow users to create groups where members of the group may share information among the group members. A user creating a group is referred to as the group administrator.

Common user profiles are used for different purposes, but they contain the same set of information about the users. However, when a group administrator creates a group of selected members, the group administrator does not have the flexibility to add group specific information in the member profiles. For example, if a social networking application requires its users to provide a name, email, and birthdate for creating a profile on the social networking application, a group administrator that wants to create a group of members having dogs is not able to request that each group member profile have information about the name of the member's dogs, the breed of the dog, and a photograph of the dog.

An extendible user profile (EUP) system disclosed herein allows users to provide extendible profiles including additional information about the group members in the member profile. For example, a messaging application may require its users to provide a name, phone number, and email address for its users' profiles. However, when a user decides to create a group (and thus become the group administrator of the created group) of users that share a particular characteristic, such group administrator may want more information about the member users of the group (referred to hereinafter as "group members"). For example, if a user Alice wants to make a group for the users that have cats called "cat lovers of Herzliya" so the members who live in Herzliya and who like cats can share stories and information about cats, Alice may want each member of the cat lovers of Herzliya group to have the name(s) of their cat(s) and the cats' pictures as part of their profile. The EUP disclosed herein allows Alice to do so as the group administrator for the cat lovers of Herzliya group.

Figure 1:
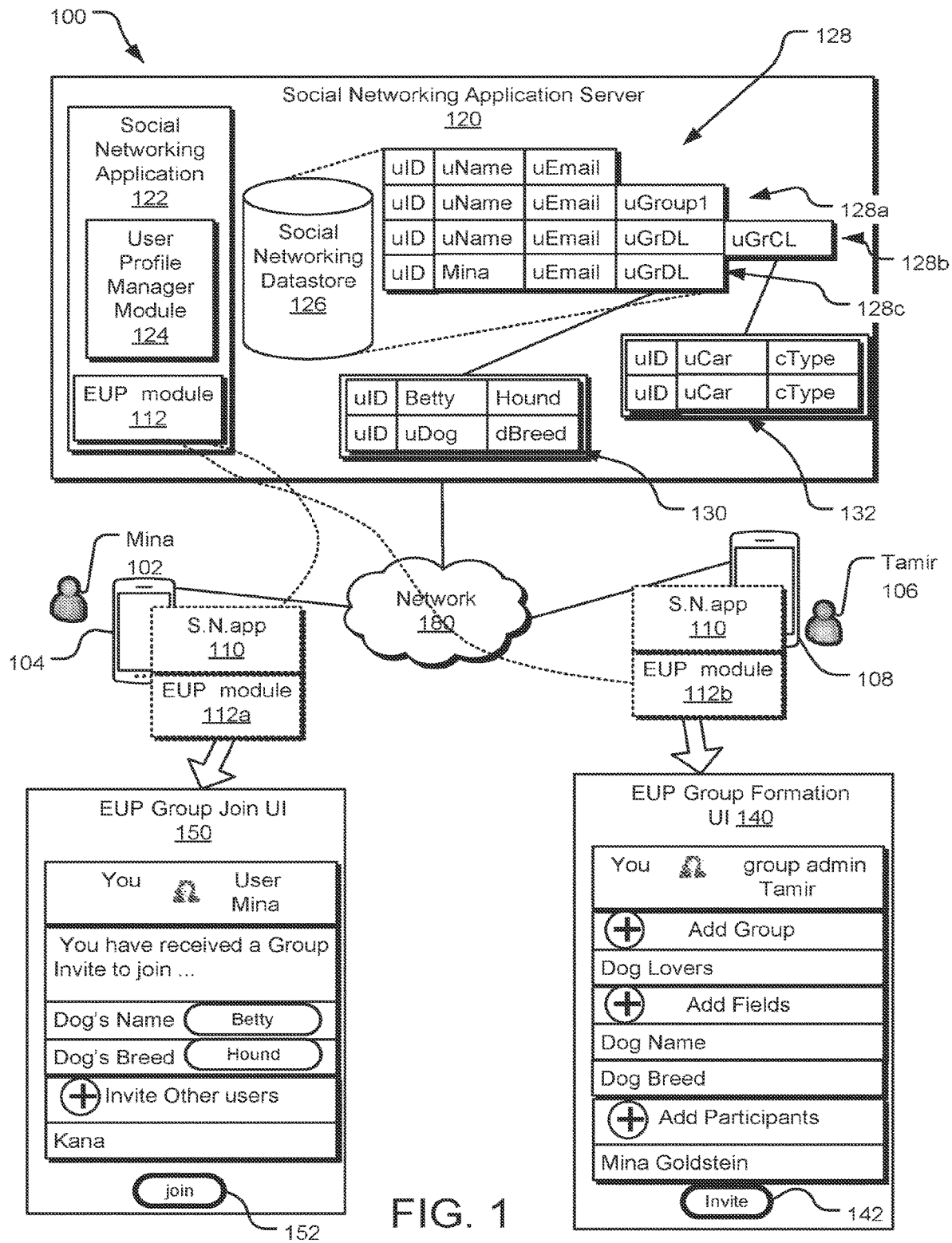

FIG. 1 illustrates an example implementation of an EUP system 100 for providing extendible user profiles for such members of groups. Specifically, the EUP system 100 is shown to be used by users Mina 102 and Tamir 106 using their computing devices such as smartphone 104 and 108. Specifically, Mina 102 and Tamir 106 may be users of a social network app 110 that they use via smartphones 104 and 108. Specifically, the social network app 110 may be installed as a client application on the smartphones 104 and 108 and supported by a social network application server 120.

In one implementation of the EUP system 100, the social network application server 120 may be implemented on a cloud server with various components located on various disparate servers but connected to each other by a network 180, such as the Internet. As illustrated, the social network application server 120 includes a social networking application 122 and a social networking datastore 126. The social networking application 122 may be implemented by computer instructions stored in a computer readable memory where the instructions are executable on a computer processor.

The social networking application 122 also includes a user profile manager module 124 and an EUP module 112. The user profile manager module 124 may be configured to manage the profiles of various users of the social networking application 122. For example, the user profile manager module 124 may manage the user profiles 128 stored in the social networking datastore 126. Specifically, the user profiles 128 are stored in a schema with extendible records. Specifically, the user profile table may include fields for each user as required by the social networking application 122. In the example implementation, each user profile includes at least a user identification (uID), a user name (uName), and user email (uEmail).

However, for the EUP system 100, the user profile records are extendible to include additional information about the users. Specifically, the user profiles 128 are extendible based on the context of member groups that the users are members of. For example, if a user is a member of a group, a field identifying the name of the group may be added to the user record.

Furthermore, the EUP module 112 may be working with local EUP modules 112a and 112b located on client devices to enable users, such as Mina 102 and Tamir 106, to create member groups, extend the member profiles with additional fields, and populate such extendible user profiles. For example, Tamir 106 may be interested in creating a new member group called Dog Lovers for the users that love dogs. In this case, Tamir 106 may select an option to create a new group, and in response to it, the EUP module 112b presents an EUP group formation user interface (UI) 140 to Tamir 106.

The EUP group formation UI 140 includes an option for Tamir 106 to add the name of the group where Tamir 106 may type in the name of the group Dog Lovers. The EUP group formation UI 140 also provides an option for Tamir 106 to add fields to the user profiles of group members of Dog Lovers. For example, Tamir 106 can add a field for "Dog Name," and field for "Dog Breed." Once Tamir 106 has provided all the fields for the group Dog Lovers, Tamir 106 may select the option to add participants to the group Dog Lovers. For example, Tamir 106 may add Mina Goldstein from the contact list of the smartphone 108. Once the participants are added, Tamir 106 may select the invite option 142 to invite the participants, including Mina Goldstein, to join the Dog Lovers group.

Once Tamir 106 selects the invite option 142, the EUP module 112b may send a message to the social networking application 122 about the creation of the new group, Dog Lovers, by Tamir 106. Specifically, the EUP module 112b may also communicate to the social networking application 122 the list of new fields that Tamir, "Dog Name," and "Dog Breed," that Tamir would like to add to the profiles of Dog Lovers group members. Additionally, the EUP module 112b may also send the list of participants, including Mina Goldstein, to the social networking application 122.

Upon receiving the list of field names to be added to the user profiles, the user profile manager module 124 may add group name as a field to the profile record for the user. Furthermore, the user profile manager module 124 also includes a Dog Lovers group table 130 for the group Dog Lovers, including fields of user identification (uID), user's dog's name (uDog), and the breed of the user's dog (uBreed). As the user profile manager module 124 receives additional information from each participant in the group Dog Lovers, the user profile manager module 124 may add records for each such group member in the Dog Lovers group table 130.

In one implementation, the user profile manager module 124 is configured to add one field to the profile record for each group that is joined by a user. Thus, for example, a profile record 128a is shown to have a field for a first group (uGroup1), a profile record 128b is shown to have fields for a Dog Lovers group (uGrDL) and Car Lovers group (uGrCL), and profile record 128c is shown to have a field for the Dog Lovers group (uGrDL). Additionally, the social networking datastore 126 includes the Dog Lovers group table 130 and a Car Lovers table 132.

Upon receiving the list of participants, such as Mina Goldstein, from the EUP group formation UI 140 on the smartphone 108, the EUP module 112 communicates with the client EUP modules of the participants' devices. For example, the EUP module 112 sends a message to the EUP module 112a on Mina 102's smartphone 104 indicating to Mina that she has been invited to join the Dog Lover's group. If Mina accepts the invitation, the EUP module 112a presents a EUP group join UN 150 to Mina. The EUP join UI 150 may present Mina 102 with options to provide values for the group fields for the Dog Lovers group, namely dog name Betty and dog breed Hound.

In one implementation, the EUP join UI 150 also gives Mina 102 the option to invite other users, such as Kana, to the Dog Lovers group. However, in an alternative implementation, addition of such additional participants, such as Kana, to the Dog Lovers group may have to be approved by the group administrator Tamir 106. Once Mina 102 selects a join button 152 to join the group, the values Betty and Hound for the group fields are communicated to the EUP module 112 and to the user profile manager module 124. The user profile manager module 124 adds these values to the Dog Lovers group table 130.

Once the group fields for a given group member to a particular group are added to the group table, if another group member of that group views the profile of the given group member, they will be see all values of all the fields in the profile. Thus, once Mina 102 has joined the Dog Lovers group and given the values of dog name and dog breed, if Tamir 106 views Mina 102's profile, Tamir 106 will see Mina's name, email, dog name, and dog breed in her profile view.

Note that in the illustrated implementation, Mina 102 provided the name of the dog and its breed while joining the Dog Lover's group. In an alternative implementation, Mina 102 may join the group without providing such information. In yet another implementation, the group administrator Tamir 106 may identify one of more of the group fields (dog name and dog breed) as mandatory for a participant to join the Dog Lover's group, in which case, Mina 102 is able to join the Dog Lovers group after she provides such information. Yet alternatively, Mina 102 may also be given the option to let the Dog Lovers group share the values of the dog name and dog breed with users of other group or users that are not members of the Dog Lovers group.

In the implementation of the EUP system 100, the social networking application 122 also allows a specific group field to override a field from the user profile. For example, the Dog Lovers group may also include a field for the user's photograph with a dog (u&dPhoto), while the user profile for the social networking application may include a field for user's photograph (uPhoto). In such an implementation, a user that is also a member of the Dog Lovers group may specify that in specific contexts, the value of u&dPhoto is displayed in the user's profile in place of the uPhoto. For example, if Mina 102 has provided her picture with Betty, she can specify that when a member of the Dog Lover's group views her profile, her photograph with Betty is shown in her profile.

Figure 2:
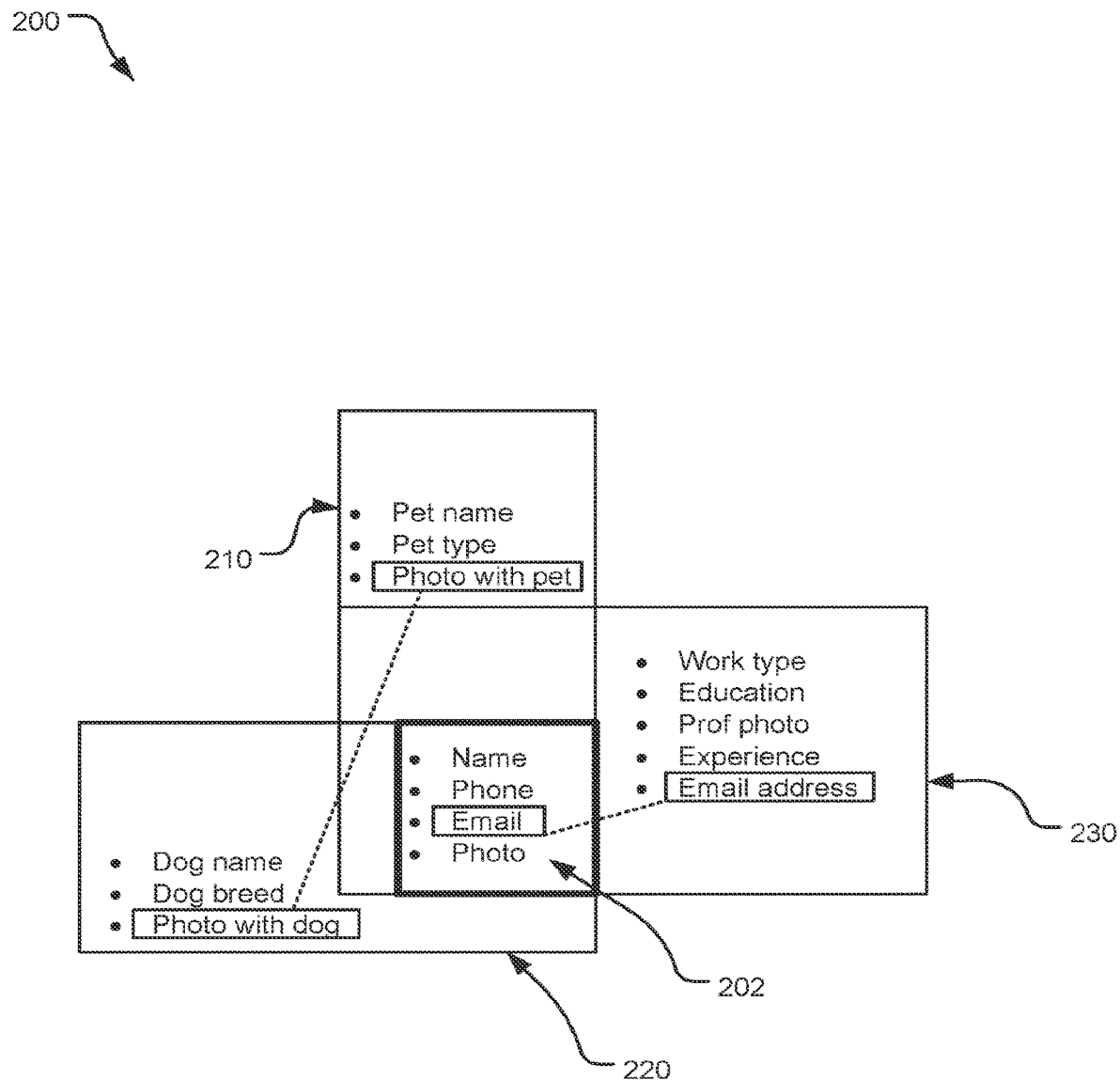

FIG. 2 provides an example visual representation of user profile fields 200 provided by the extendible user profile system disclosed herein. Specifically, the user profile fields 200 may include application user profile fields 202 required by an application, such as a social networking application. The user profile fields 200 also includes group fields for a pet owners group 210, group fields for a dog owners group 220, and group fields for a professional networking group 230.

As shown, the extendible user profile system disclosed herein allows group administrators for each of the groups 210, 220, 230 specify group fields for its members. When a user of the application joins one of the groups 210, 220, 230, the user may provide values of the group specific fields. For example, when a user joins the dog owners group 220, the user may provide values of the dog name, the dog breed, and the photo with dog. The user may also specify that they would like to override one of the application user profile fields 202 when viewed by other members of such group. Thus, a member of the dog owner's group 220 may specify that when other members of the dog owners group 220 view the profile, the photo with dog is shown.

Yet alternatively, the user may also specify to adopt a field from another group for use in a selected group. Thus, if a user has already joined the pet owners group 210 and provided a photo with pet, the user may specify that when a member of the dog owners group 220 views the profile, the photo with pet is shown to such member. Yet alternatively, a user may provide a value of an application user profile field 202 that is generally opaque to other users of the application but it may be used as a group field. For example, the email address may be part of the application user profile fields 202 but not disclosed to other users. However, upon joining the professional networking group 220, the user may specify that the members of the professional networking group 220 should be able to see the email address from the application user profile fields 202. In an alternative implementation, this option to adopt a field from another group may also be available to a group administrator. For example, the group administrator of the groups cat lovers of Herzliya and pet lovers of Herzliya may indicate that the "picture with a pet" field that he defined in each of these two groups is the same one. This way if a user joins one of these two groups and sets his photo with his cat, later when that user joins the second group, this field is already pre-populated with his picture from the first group and is just awaiting his confirmation.

Figure 3:
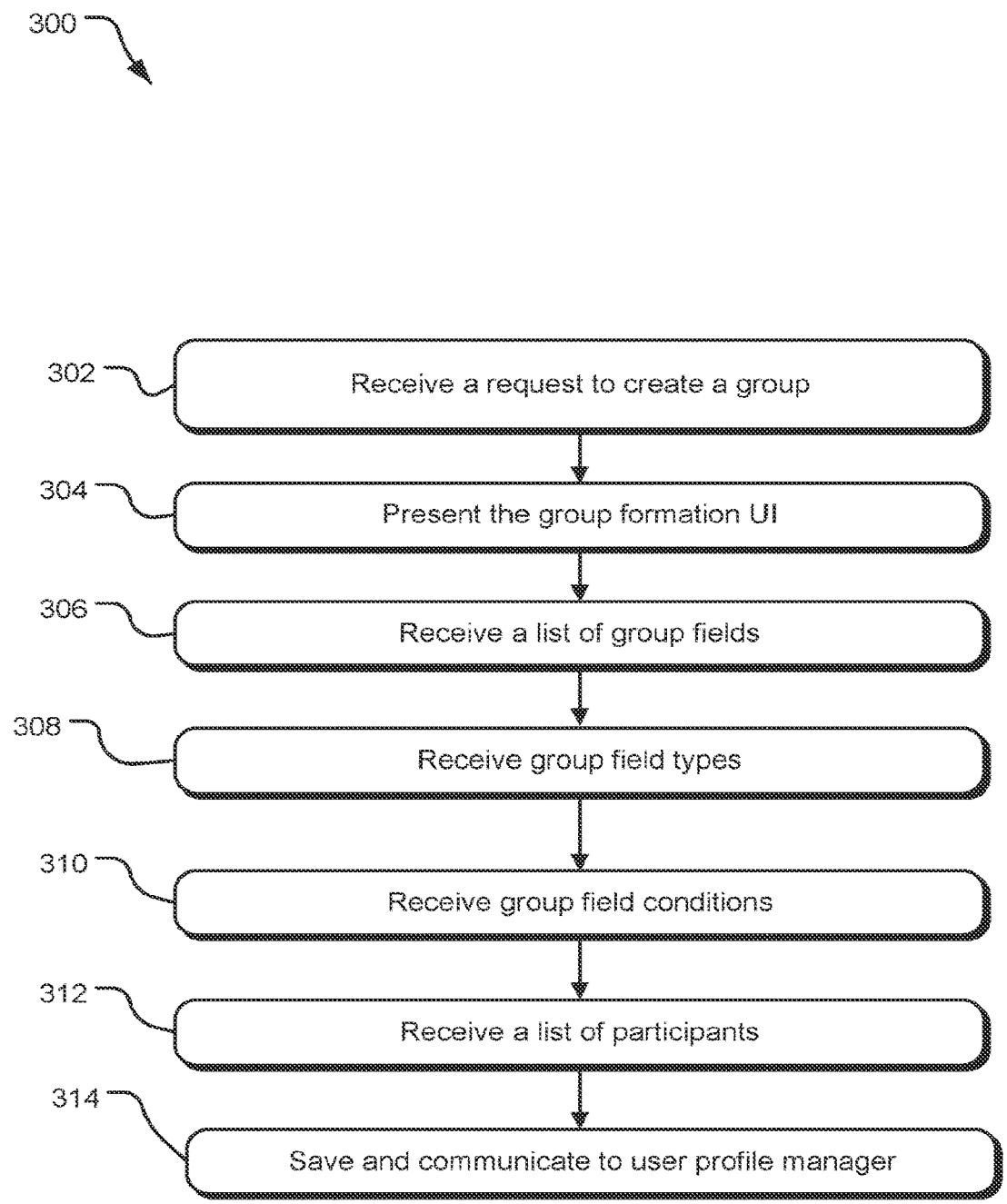
FIG. 3 illustrates example operations of the system for providing extendible user profiles.

FIG. 3 illustrates example operations 300 of the system for providing extendible user profiles. Specifically, an operation 302 receives a request from a user of an application to create a group. For example, the operation 302 may receive a request from a user to create a parent-teacher association (PTA) group. An operation 304 presents a group formation UI (such as the group formation UI 140) of FIG. 1. An operation 306 receives a list of group fields. For example, in the case of the user (group administrator) creating the PTA group, the group administrator may specify the child name, child school year, and child sport as the fields for users joining the PTA group.

An operation 308 may receive group field types or list of drop down values that a user can select from. F or example, for the PTA group, the group administrator may specify that the type of child school year is numeric. Alternatively, other fields can be specified to be text, image, etc. Optionally, the PTA group administrator may limit the size of the field to specific number of characters, or specify the field to be of a specific type, such as a numeric field, a field that can be selected from a set of values (e.g.: male, female), or a field that contains a specific type of file (jpg, pdf), etc. Alternatively, the PTA group administrator may provide a list of sports that a user can select from when populating the child sport. An operation 310 receives group field conditions. For example, the PTA group administrator may specify that the child school year is no less than 5 and no greater than 12. An operation 312 receives a list of participants that the group administrator would like to invite to join the group. An operation 314 saves various information received at operations 306 to 314 and communicates with a user profile manager module (such as the user profile manager module 124 of FIG. 1).

Figure 4:
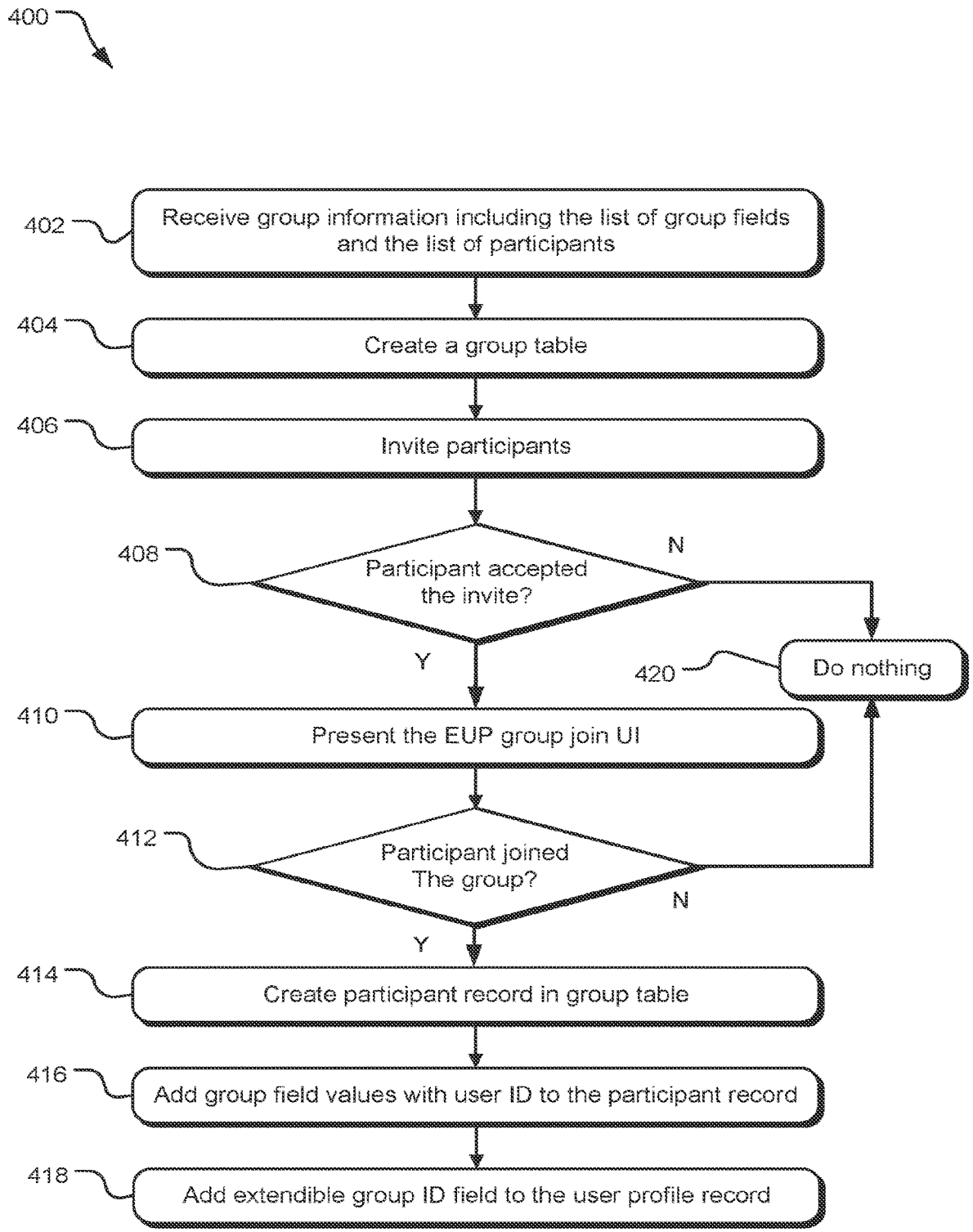
FIG. 4 illustrates alternative example operations of the system for providing extendible user profiles.

FIG. 4 illustrates alternative example operations 400 of the system for providing extendible user profiles. An operation 402 receives the group information from the group administrator including the list of group fields, various characteristics of the group fields, and the list of participants invited to join the group. For example, for the group administrator creating the PTA group, the operation 402 receives the name of the PTA group, the list of fields child name, child school year, and child sport and their types, restrictions, etc., and the list of users invited by the PTA group administrator to join the PTA group.

An operation 404 creates a PTA group table for the PTA group including the PTA group fields child name, child school year, and child sport. Each record of the PTA group table also includes a user ID that identifies the group member. An operation 406 sends invites to the participants provided by the PTA group administrator. For example, such an invite may be a text message on a mobile device, an email, a message within the application, etc. In response to the invite, the user may elect to join the group an operation 408 determines if the invited participant has accepted the invite.

If the invited participant has accepted the invite, an operation 410 presents the EUP group join UI (such as the EUP group join UI 150 of FIG. 1). The invited participant may provide various information such as values of the group fields using the EUP group join UI. An operation 412 determines if the participant has joined the group. If the invited participant has joined the group, an operation 414 creates a participant record in the group table. For example, if a participant Joe fills out the information, including values of the PTA group fields, using the EUP group join UI and selects the join option to of the EUP group join UI, the operation 414 creates a record for Joe in the PTA group table.

An operation 416 adds a group field values with the ID of the user to the group table. For example, in the example where Joe is joining the PTA group, the values of the PTA group fields as provided by Joe are used to create a new record for Joe in the PTA group table. An operation 418 adds an extendible group ID field to the user profile record for Joe so as to link Joe's PTA group field values from the PTA group table to other field values of Joe's user profile record.

Figure 5:
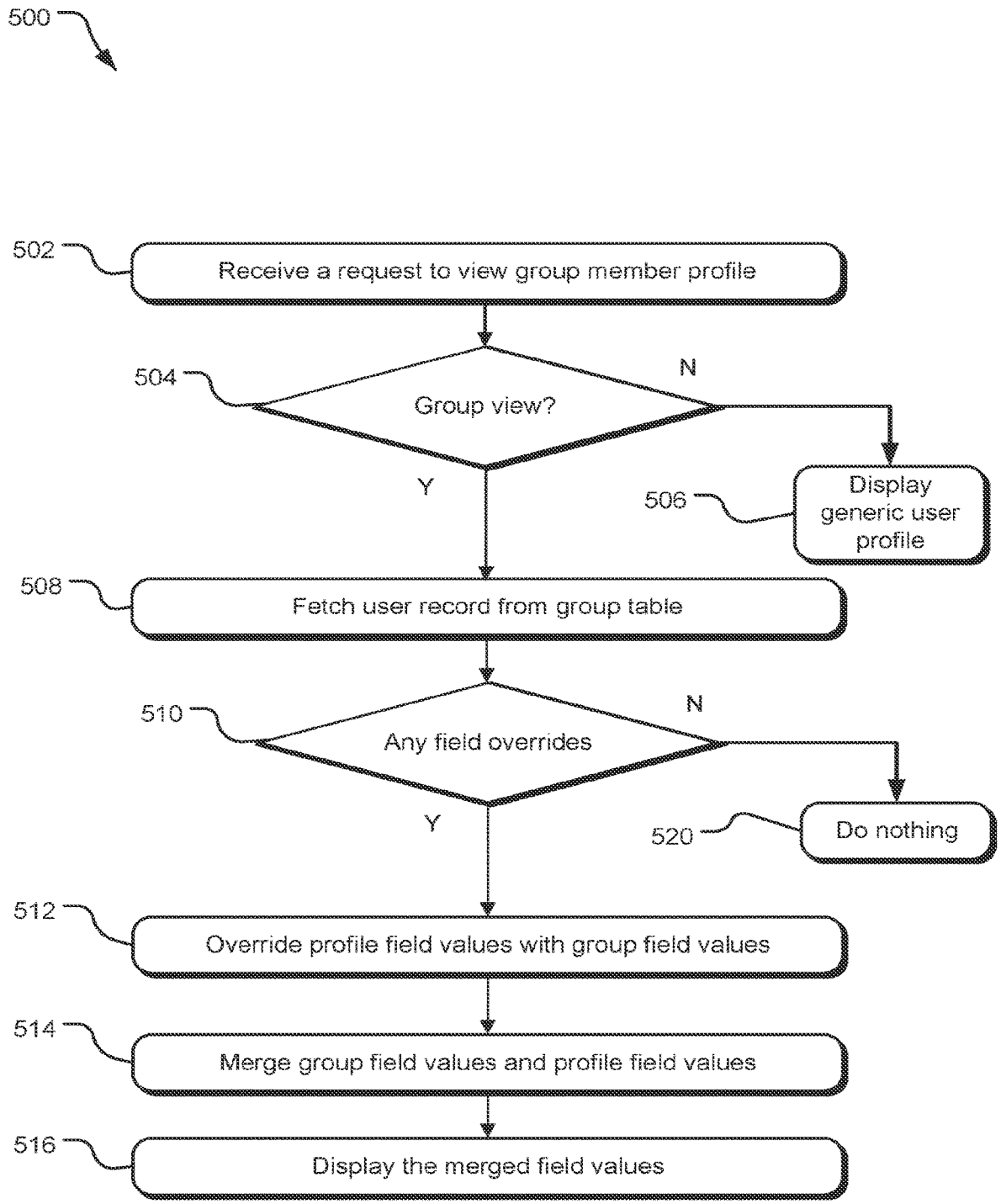
FIG. 5 illustrates alternative example operations of the system for providing extendible user profiles.

FIG. 5 illustrates alternative example operations 500 of the system for displaying extendible user profiles. An operation 502 receives a request to view a profile of a group member. For example, such request may result from a search by another user or simply from a user clicking on an icon of the group member. An operation 504 determines if the request from a group member or from another user. For example, in the case of Joe being a member of the PTA group, if Rachel has requested to view Joe's profile, the operation 504 determines if Rachel is part of the PTA group or not. Note that if Joe is part of more than one group, the operation 504 determines if Rachel is part of any of such groups that Joe is a member of.

If the operation 504 determines that Rachel is not member of any group that Joe is a member of, an operation 506 shows a generic user profile of Joe. However, if Rachel is a member of a group, such as the PTA group, that Joe is also a member, an operation 508 fetches Joe's user record from the PTA group table. For example, Joe's record from the PTA group table may include values of the fields child name, child school year, and child sport.

An operation 508 determines if Joe has specified any field overrides. For example, Joe may have specified that the value of the child name as provided in the PTA group table is displayed to members of the PTA group instead of a child name value given in the generic profile of Joe. If there is such an override, an operation 512 replaces the value of the overridden field with the value from the PTA group table. An operation 514 merges the group field values with the profile field values, and an operation 516 displays such merged field values as part of the profile presented to Rachel.

Figure 6:
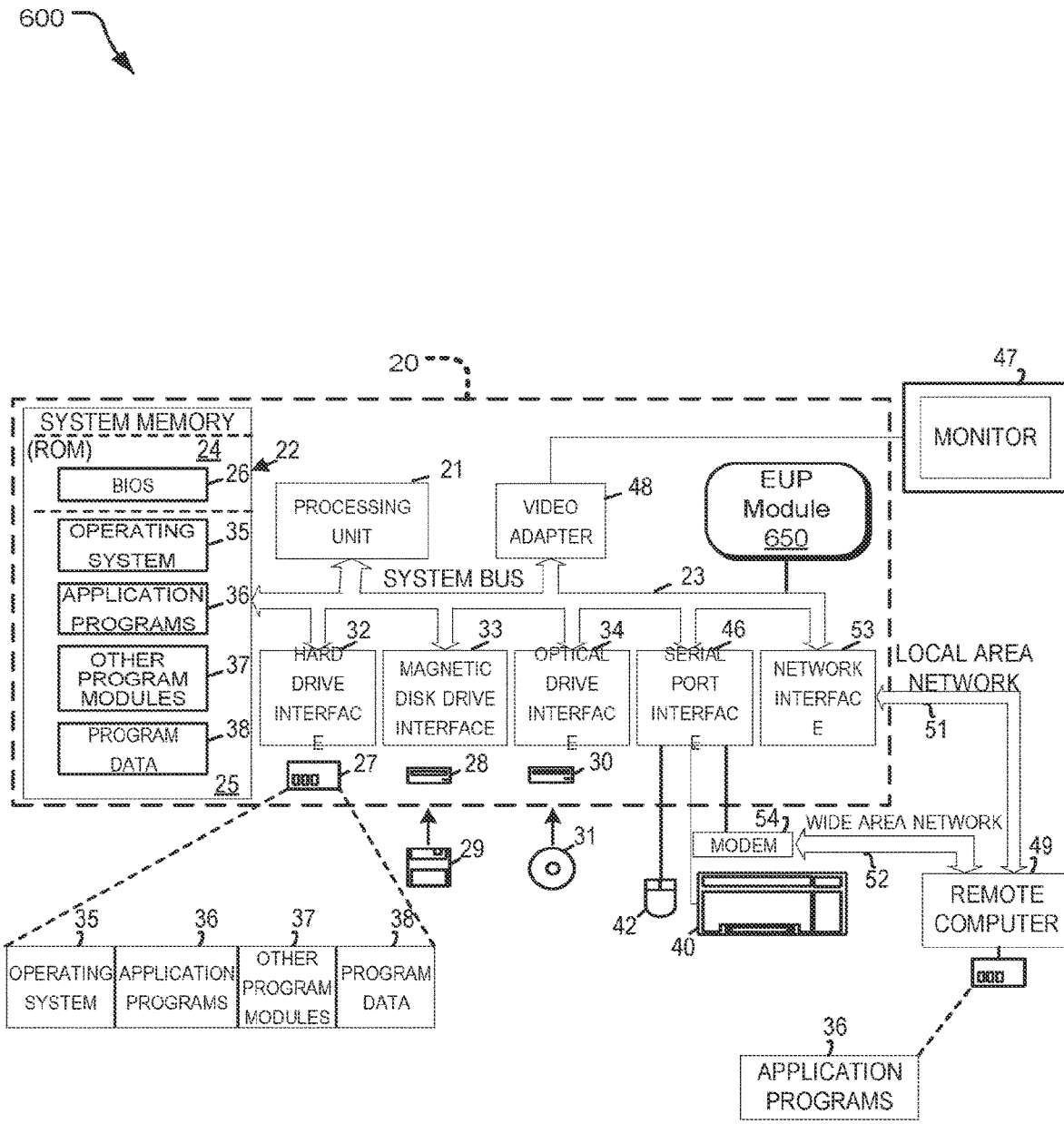
FIG. 6 illustrates an example system that may be useful in implementing the described technology for providing extendible user profiles.

FIG. 6 illustrates an example system 600 that may be useful in implementing the image rendition system disclosed herein. The example hardware and operating environment of FIG. 6 for implementing the described technology includes a computing device, such as a general-purpose computing device in the form of a computer 20, a mobile telephone, a personal data assistant (PDA), a tablet, smart watch, gaming remote, or other type of computing device. In the implementation of HG. 6, for example, the computer 20 includes a processing unit 21, a system memory 22, and a system bus 23 that operatively couples various system components including the system memory to the processing unit 21. There may be only one or there may be more than one processing unit 21, such that the processor of a computer 20 comprises a single central-processing unit (CPU), or a plurality of processing units, commonly referred to as a parallel processing environment. The computer 20 may be a conventional computer, a distributed computer, or any other type of computer; the implementations are not so limited.

In the example implementation of the computing system 600, the computer 20 also includes a EUP module 650 providing one or more functions of the EUP system disclosed herein. The system bus 23 may be any of several types of bus structures including a memory bus or memory controller, a peripheral bus, a switched fabric, point-to-point connections, and a local bus using any of a variety of bus architectures. The system memory may also be referred to as simply the memory, and includes read-only memory (ROM) 24 and random access memory (RAM) 25. A basic input/output system (BIOS) 26, containing the basic routines that help to transfer information between elements within the computer 20, such as during start-up, is stored in ROM 24. The computer 20 further includes a hard disk drive 27 for reading from and writing to a hard disk (not shown), a magnetic disk drive 28 for reading from or writing to a removable magnetic disk 29, and an optical disk drive 30 for reading from or writing to a removable optical disk 31 such as a CD ROM, DVD, or other optical media. The computer 20 may be used to implement an EUP module such as the EUP module 112 of FIG. 1.

Furthermore, instructions stored on the memory of the computer 20 may be used by an EUP system. Similarly, instructions stored on the memory of the computer 20 may also be used to implement one or more operations of a EUP system disclosed herein.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated tangible computer-readable media provide nonvolatile storage of computer-readable instructions, data structures, program modules, and other data for the computer 20. It should be appreciated by those skilled in the art that any type of tangible computer-readable media may be used in the example operating environment.

A number of program modules may be stored on the hard disk, magnetic disk 29, optical disk 31, ROM 24, or RAM 25, including an operating system 35, one or more application programs 36, other program modules 37, and program data 38. A user may generate reminders on the personal computer 20 through input devices such as a keyboard 40 and pointing device 42. Other input devices (not shown) may include a microphone (e.g., for voice input), a camera (e.g., for a natural user interface (NUI)), a joystick, a game pad, a satellite dish, a scanner, or the like. These and other input devices are often connected to the processing unit 21 through a serial port interface 46 that is coupled to the system bus but may be connected by other interfaces, such as a parallel port, game port, or a universal serial bus (USB). A monitor 47 or other type of display device is also connected to the system bus 23 via an interface, such as a video adapter 48. In addition to the monitor, computers typically include other peripheral output devices (not shown), such as speakers and printers.

The computer 20 may operate in a networked environment using logical connections to one or more remote computers, such as remote computer 49. These logical connections are achieved by a communication device coupled to or a part of the computer 20; the implementations are not limited to a particular type of communications device. The remote computer 49 may be another computer, a server, a router, a network PC, a client, a peer device or other common network node, and typically includes many or all of the elements described above relative to the computer 20. The logical connections depicted in FIG. 6 include a local-area network (LAN) 51 and a wide-area network (WAN) 52. Such networking environments are commonplace in office networks, enterprise-wide computer networks, intranets and the Internet, which are all types of networks.

When used in a LAN-networking environment, the computer 20 is connected to the local area network 51 through a network interface or adapter 53, which is one type of communications device. When used in a WAN-networking environment, the computer 20 typically includes a modem 54, a network adapter, a type of communications device, or any other type of communications device for establishing communications over the wide area network 52. The modem 54, which may be internal or external, is connected to the system bus 23 via the serial port interface 46. In a networked environment, program engines depicted relative to the personal computer 20, or portions thereof, may be stored in the remote memory storage device. It is appreciated that the network connections shown are example and other means of communications devices for establishing a communications link between the computers may be used.

In an example implementation, software or firmware instructions for the EUP system disclosed herein may be stored in system memory 22 and/or storage devices 29 or 31 and processed by the processing unit 21. User profile data may be stored in system memory 22 and/or storage devices 29 or 31 as persistent data-stores. An EUP module 650 communicatively connected with the processing unit 21 and the memory 22 may enable one or more of the capabilities of the EUP system disclosed herein.

In contrast to tangible computer-readable storage media, intangible computer-readable communication signals may embody computer readable instructions, data structures, program modules or other data resident in a modulated data signal, such as a carrier wave or other signal transport mechanism. The term "modulated data signal" means a signal that has one or more of its characteristics set or changed in such a manner as to encode information in the signal. By way of example, and not limitation, intangible communication signals include wired media such as a wired network or direct-wired connection, and wireless media such as acoustic, RF, infrared and other wireless media.

Figure 7:
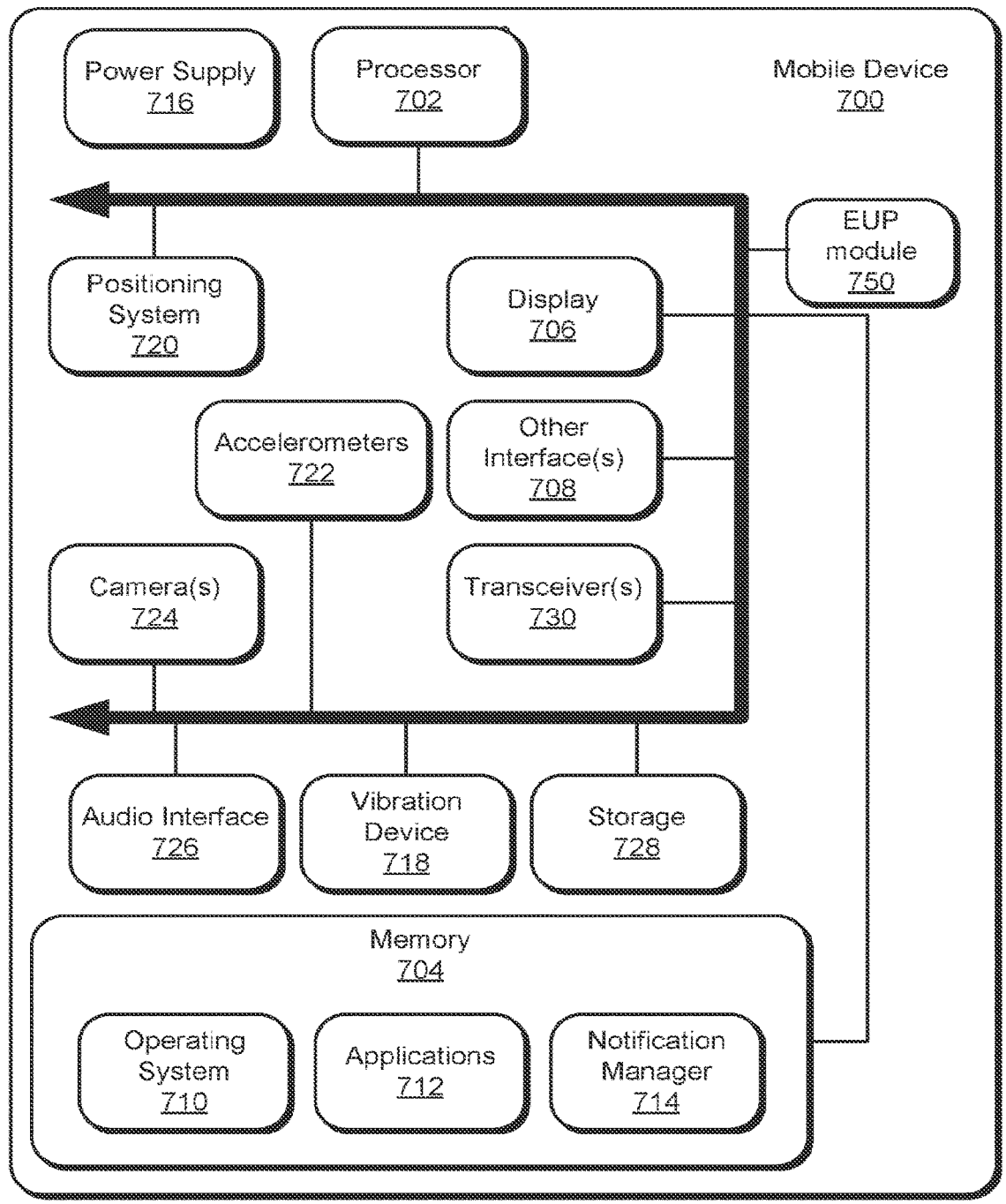
FIG. 7 illustrates an example mobile device that may be useful in implementing the described technology for providing extendible user profiles.

FIG. 7 illustrates another example system (labeled as a mobile device 700) that may be useful in implementing the described technology. The mobile device 700 includes a processor 702, a memory 704, a display 706 (e.g., a touch-screen display), and other interfaces 708 (e.g., a keyboard). The memory 704 generally includes both volatile memory (e.g., RAM) and non-volatile memory (e.g., flash memory). An operating system 710, such as the Microsoft Windows® Phone operating system, resides in the memory 704 and is executed by the processor 702, although it should be understood that other operating systems may be employed.

One or more application programs 712 are loaded in the memory 704 and executed on the operating system 710 by the processor 702. Examples of applications 712 include without limitation email programs, scheduling programs, personal information managers, Internet browsing programs, multimedia player applications, etc. A notification manager 714 is also loaded in the memory 704 and is executed by the processor 702 to present notifications to the user. For example, when a promotion is triggered and presented to the shopper, the notification manager 714 can cause the mobile device 700 to beep or vibrate (via the vibration device 718) and display the promotion on the display 706.

The mobile device 700 includes a power supply 716, which is powered by one or more batteries or other power sources and which provides power to other components of the mobile device 700. The power supply 716 may also be connected to an external power source that overrides or recharges the built-in batteries or other power sources.

The mobile device 700 includes one or more communication transceivers 730 to provide network connectivity (e.g., mobile phone network, Wi-Fi®, BlueTooth®, etc.). The mobile device 700 also includes various other components, such as a positioning system 720 (e.g., a global positioning satellite transceiver), one or more accelerometers 722, one or more cameras 724, an audio interface 726 (e.g., a microphone, an audio amplifier and speaker and/or audio jack), and additional storage 728. Other configurations may also be employed.

In an example implementation, a mobile operating system, various applications, and other modules and services may be embodied by instructions stored in memory 704 and/or storage devices 728 and processed by the processing unit 702. User preferences, service options, and other data may be stored in memory 704 and/or storage devices 728 as persistent datastores. An EUP module 750 communicatively connected with the processor 702 and the memory 704 may enable one or more of the capabilities of the personalized user experience delivery system disclosed herein.

The EUP system disclosed herein provides solution to a technological problem necessitated by user's desire to participate in a large number of groups and to have selected and customized profiles for the different groups. Specifically, the EUP system disclosed herein provides an unconventional technical solution to this technological problem by allowing group administrators to create group specific fields for the users participating in the group and the user's desire to override displaying of certain fields in their profile with other fields as appropriate for a specific group.

A method for providing extendible user profiles includes receiving a request from a group administrator to create a new group for a group of users of an application, providing a group formation user interface to the group administrator, wherein the group formation user interface allows the group administrator to add group specific fields, creating a group table including the group specific fields, and linking the group table to user profile tables of the group of users. In one implementation, the method further includes presenting a group join user interface to a user joining the group, wherein the group join user interface presents the group specific fields. In an alternative implementation, the method further includes receiving values of one or more of the group specific fields from the user joining the group and displaying the values of the group specific fields to other members of the group.

In one implementation of the method, at least one of the group specific field overrides a field in the user profile table. Alternatively, the user profile table includes one or more group joined fields for the one of more groups joined by a user and the method further comprises adding the group to the group joined fields. Yet alternatively, the method further includes linking the group table to the user profile table using based on the group join field. In one implementation, a group specific field is shared between at least two or more groups. In another implementation, one or more of the group specific fields are exposed to one or more other groups as specified by the user. Alternatively, one or more of the group specific fields are exposed to one or more other groups as specified by the group administrator.

A physical article of manufacture including one or more tangible computer-readable storage media, encoding computer-executable instructions for executing on a computer system a computer process, wherein the computer process includes receiving a request from a group administrator to create a new group for a group of users of a social networking application, providing a group formation user interface to the group administrator, wherein the group formation user interface allows the group administrator to add group specific fields, creating a group table including the group specific fields, linking the group table to user profile tables of the group of users, and presenting a group join user interface to a user joining the group, wherein the group join user interface presents the group specific fields.

In one implementation, the computer-executable instructions further includes receiving values of one or more of the group specific fields from the user joining the group. In another implementation, the computer-executable instructions further includes displaying the values of the group specific fields to other members of the group. In yet another implementation, at least one of the group specific field overrides a field in the user profile table. Alternatively, the user profile table includes a group joined held including listing of one of more groups joined by a user and the method further comprises adding the group to the group joined field. Yet alternatively, the computer-executable instructions further includes linking the group table to the user profile table using based on the group join field. Alternatively, one or more of the group specific fields are exposed to one or more other groups as specified by at least one of the user and the group administrator.

A system for providing extendible user profiles includes a memory; one or more processor units; an extendible user profiles (EUP) module stored in the memory and executable by the one or more processor units, the EUP module configured to provide a group formation user interface to the group administrator, wherein the group formation user interface allows the group administrator to add group specific fields for a group of users of a social networking application and receive a plurality of group specific fields from the group administrator; and a user profile manager application stored in the memory and executable by the one or more processor units, the user profile manager application configured to create a group table including the group specific fields and link the group table to a user profile table.

In one implementation, the EUP module is further configured to present a group join user interface to a user joining the group, wherein the group join user interface presents the group specific fields. Alternatively, the user profile manager application is further configured to add one or more groups to the group joined fields of the user profile table. Yet alternatively, at least one of the group specific field overrides a field in the user profile table.

The above specification, examples, and data provide a complete description of the structure and use of exemplary embodiments of the invention. Since many implementations of the invention can be made without departing from the spirit and scope of the invention, the invention resides in the claims hereinafter appended. Furthermore, structural features of the different embodiments may be combined in yet another implementation without departing from the recited claims.

What is claimed is:

1. A computer-implemented method of providing one or more displays of user profile information, the computer-implemented method comprising:
    accessing a user profile table comprising a first user profile field, a first value of the first user profile field being used to provide a first display of a graphical user interface (GUI) to a first user who is not a member of a group;
    creating a group table, associated with the group, including a group specific field added by a group administrator and configured to receive, subsequent to a second user joining the group, a second value provided by the second user;
    receiving a first user specification of the second value of the group specific field;
    receiving a second user specification of a field override defining a context for controlling application of the group specific field added by the group administrator; and
    based on the first user specification and the second user specification, providing a second display of the GUI that is different from the first display by using the second value of the group specific field added by the group administrator to override the first value of the first user profile field, wherein the second value of the group specific field is used to present the second display to a third user who is a member of the group.

2. The computer-implemented method of claim 1, further comprising:
    receiving, from the third user, a request to view the user profile table of the second user; and
    determining that the third user is a member of the group.

3. The computer-implemented method of claim 1, further comprising receiving, from the second user, a request for the second value of the group specific field to override the first value of the first user profile field when providing a display to another member of the group.

4. The computer-implemented method of claim 1, wherein the user profile table for the second user further comprises a second user profile field and wherein a third value for the second user profile field is used in providing the first display and in providing the second display.

5. The computer-implemented method of claim 1, wherein the user profile table is part of a user profile for a social networking application.

6. The computer-implemented method of claim 1, wherein the group table includes a second group specific field configured to receive a third value provided by the second user joining a second group; and wherein the computer-implemented method further comprises providing a third display that is different from the first display by using the third value of the second group specific field to override the first value of the first user profile field while the first value of the first user profile field of the application user profile is maintained.

7. The computer-implemented method of claim 1, wherein the context defined by the field override further specifies conditions under which the second value of the group specified field overrides the first value of the first user profile field.

8. An article of manufacture including one or more computer-readable storage devices encoding computer-executable instructions for executing a computer process on a computer system, the computer process comprising:
    accessing a user profile table comprising a first user profile field, a first value of the first user profile field being used to provide a first display of a graphical user interface (GUI) to a first user who is not a member of a group;
    creating a group table, associated with the group, including a group specific field added by a group administrator and configured to receive, subsequent to a second user joining the group, a second value provided by the second user;
    receiving a first user specification of the second value of the group specific field;
    receiving a second user specification of a field override defining a context for controlling application of the group specific field added by the group administrator; and
    based on the first user specification and the second user specification, providing a second display of the GUI that is different from the first display by using the second value of the group specific field added by the group administrator to override the first value of the first user profile field, wherein the second value of the group specific field is used to present the second display to a third user who is a member of the group.

9. The article of manufacture of claim 8, wherein the computer process further comprises:
    receiving, from the third user, a request to view the user profile table of the second user; and
    determining that the third user is a member of the group.

10. The article of manufacture of claim 8, wherein the computer process further comprises receiving, from the second user, a request for the second value of the group specific field to override the first value of the first user profile field when providing a display to another member of the group.

11. The article of manufacture of claim 8, wherein the user profile table for the second user further comprises a second user profile field, and wherein a third value of the second user profile field is used in providing the first display and in providing the second display.

12. The article of manufacture of claim 8, wherein the group table includes a second group specific field configured to receive a third value provided by the second user joining a second group; and wherein the computer process further comprises providing a third display that is different from the first display by using the third value of the second group specific field to override the first value of the first user profile field while the first value of the first user profile field of the user profile table is maintained.

13. A system for providing one or more displays of user profile information, the system comprising:
   one or more processor units; and
   one or more computer-readable storage devices encoding computer-executable instructions that, when executed by the one or more processor units, implements a method comprising:
      accessing a user profile table comprising a first user profile field, a first value of the first user profile field being used to provide a first display of a graphical user interface (GUI) to a first user who is not a member of a group;
      creating a group table, associated with the group, including a group specific field added by a group administrator and configured to receive, subsequent to a second user joining the group, a second value provided by the second user;
      receiving a first user specification of the second value of the group specific field;
      receiving a second user specification of a field override defining a context for controlling application of the group specific field added by the group administrator; and
      based on the first user specification and the second user specification, providing a second display of the GUI that is different from the first display by using the second value of the group specific field added by the group administrator to override the first value of the first user profile field, wherein the second value of the group specific field is used to present the second display to a third user who is a member of the group.

14. The system of claim 13, wherein the method implemented by the one or more processor units executing the computer-executable instructions further comprises:
   receiving, from the third user, a request to view the user profile table of the second user; and
   determining that the third user is a member of the group.

15. The system of claim 13, wherein the user profile table for the second user further comprises a second user profile field and wherein a third value of the second user profile field is used in providing the first display and in providing the second display.

16. The system of claim 13, wherein the user profile table is a user profile for a social networking application.

17. The system of claim 13, wherein the context defined by the field override further specifies conditions under which the second value of the group specified field overrides the first value of the first user profile field.

* * * * *